United States Patent
Miki

(10) Patent No.: US 9,898,243 B2
(45) Date of Patent: Feb. 20, 2018

(54) INFORMATION PROCESSING APPARATUS, PROGRAM, INFORMATION PROCESSING SYSTEM, AND INFORMATION PROCESSING METHOD

(71) Applicant: Morio Miki, Kanagawa (JP)

(72) Inventor: Morio Miki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 234 days.

(21) Appl. No.: 14/522,689

(22) Filed: Oct. 24, 2014

(65) Prior Publication Data
US 2015/0153996 A1    Jun. 4, 2015

(30) Foreign Application Priority Data

Nov. 29, 2013 (JP) ................. 2013-246955

(51) Int. Cl.
*G06T 3/40* (2006.01)
*G06F 3/14* (2006.01)
*G09G 5/12* (2006.01)
*G09G 5/373* (2006.01)
*G09G 5/377* (2006.01)
(Continued)

(52) U.S. Cl.
CPC .......... *G06F 3/1462* (2013.01); *G06F 3/1454* (2013.01); *G09G 5/12* (2013.01); *G09G 5/373* (2013.01); *G09G 5/377* (2013.01); *H04L 65/403* (2013.01); *H04L 65/604* (2013.01);
(Continued)

(58) Field of Classification Search
CPC ............................. G06F 3/0484; H04L 65/403
See application file for complete search history.

(56) References Cited

U.S. PATENT DOCUMENTS 6,343,313 B1    1/2002 Salesky et al.
8,743,022 B2    6/2014 Masuda et al.
(Continued)

FOREIGN PATENT DOCUMENTS

EP    2518607 A1    10/2012
JP    2004-280201    10/2004
(Continued)

OTHER PUBLICATIONS

Extended European Search Report dated Feb. 25, 2015 for corresponding EP Application No. 14190790.
Japanese Office Action dated Aug. 29, 2017.

*Primary Examiner* — Phi Hoang
(74) *Attorney, Agent, or Firm* — Harness, Dickey & Pierce, P.L.C.

(57) ABSTRACT

An information processing apparatus for displaying a specified display area of target data in a display unit, the target data being shared with another information processing apparatus. The information processing apparatus includes: a reception unit that receives information indicative of the specified display area specified in the another information processing apparatus; and a display controlling unit that scales the specified display area and an image in a peripheral portion of the specified display area and displays the specified display area and the image in the display unit such that the specified display area is included in a display field of the display unit based on the received information indicative of the specified display area and information about the display field of the display unit.

27 Claims, 15 Drawing Sheets

(51) Int. Cl.
*H04L 29/06* (2006.01)
*H04L 12/18* (2006.01)

(52) U.S. Cl.
CPC ............... *G09G 2340/045* (2013.01); *G09G 2340/0442* (2013.01); *H04L 12/1822* (2013.01)

(56) References Cited

U.S. PATENT DOCUMENTS

| | | | |
|---|---|---|---|
| 2003/0048281 A1* | 3/2003 | Murai | G06F 3/14 345/620 |
| 2006/0215696 A1 | 9/2006 | Fukuta et al. | |
| 2007/0226625 A1* | 9/2007 | Cardone | G06Q 90/00 715/732 |
| 2010/0174773 A1* | 7/2010 | Penner | G06Q 10/10 709/203 |
| 2011/0304713 A1* | 12/2011 | Tardif | G06F 3/1423 348/54 |
| 2012/0284635 A1* | 11/2012 | Sitrick | G06Q 10/101 715/751 |
| 2013/0219451 A1* | 8/2013 | Chaudhury | G06F 21/10 726/1 |
| 2013/0286174 A1 | 10/2013 | Urakabe | |
| 2014/0244740 A1* | 8/2014 | Bhogal | H04L 65/4038 709/204 |
| 2015/0128069 A1* | 5/2015 | Ouyang | H04L 65/605 715/753 |

FOREIGN PATENT DOCUMENTS

| | | |
|---|---|---|
| JP | 2005-006182 A | 1/2005 |
| JP | 2006-270675 | 10/2006 |
| JP | 2007-018517 | 1/2007 |
| JP | 2008-040703 A | 2/2008 |
| JP | 2011-134122 | 7/2011 |
| JP | 2012-108872 | 6/2012 |
| JP | 2012-157683 | 8/2012 |
| JP | 4998525 | 8/2012 |
| JP | 2013-0123081 A | 6/2013 |

* cited by examiner

FIG.5

| CONFERENCE ID 501 | MESSAGE ID 502 | REQUEST GUID 503 | DATE AND TIME 504 | MATERIAL ID 505 | PAGE NUMBER 506 | SYNCHRONIZATION DATA 507 |
|---|---|---|---|---|---|---|
| k001 | 100 | 21967af8-fb8b-4867-8e8f-fb0bd21cca8a | 8/01/20xx 09:30:20:500 | d100 | 10 | x0 = 100, x0 = 100<br>w = 200, h = 300 |
| k002 | 100 | 589ebdca-92a1-42ef-b35d-44f04e27c1be | 8/01/20xx 09:33:20:500 | d200 | 130 | x0 = 0, y0 = 0<br>W = 400, h = 200 |
| k001 | 200 | 467c7691-3d2a-43f5-bcf0-8ee9f2ed80f2 | 8/01/20xx 09:35:30:000 | d100 | 10 | Black, Bold<br>X1 = 10, Y1 = 10<br>X2 = 11, Y2 = 12<br>:<br>Xn = 13, Yn = 11 | ical processing system, and
INFORMATION PROCESSING APPARATUS, PROGRAM, INFORMATION PROCESSING SYSTEM, AND INFORMATION PROCESSING METHOD

BACKGROUND OF THE INVENTION

1. Field of the Invention

The present invention relates to an information processing apparatus, a program, an information processing system, and an information processing method.

2. Description of the Related Art

There are paperless conference systems using a terminal device such as a tablet terminal (refer to Patent Document 1, for example). In the paperless conference system, it is possible to synchronize a display screen of a presenter's terminal device with a display screen of a participant's terminal device to share displays in accordance with an operation by the presenter. Types of synchronization of the display screens include synchronization of page flipping, synchronization of handwritten memorandums, and synchronization of scaling, for example.

Some communication systems are capable of synchronizing, between personal computers or terminal devices in communication, input of character data to display screens, scrolling operations on the display screens, and scaling of the display screens (refer to Patent Document 2, for example).

When a display is shared at a paperless conference, for example, using a plurality of terminals such as tablet terminals or smart phones, a direction of the display screen, an aspect ratio, and the like may be different in each terminal. Further, in terminals such as tablet terminals or smart phones, the aspect ratio of the display screen changes depending on a direction of the terminal.

[Patent Document 1] Japanese Laid-Open Patent Application No. 2012-108872

[Patent Document 2] Japanese Laid-Open Patent Application No. 2004-280201

SUMMARY OF THE INVENTION

It is a general object of at least one embodiment of the present invention to provide an information processing apparatus for facilitating synchronization of display screens between a plurality of terminals having different directions of display screens, different aspect ratios, or the like.

In an embodiment, an information processing apparatus for displaying a specified display area of target data in a display unit, the target data being shared with another information processing apparatus, is provided. The information processing apparatus includes: a reception unit that receives information indicative of the specified display area specified in the another information processing apparatus; and a display controlling unit that scales the specified display area and an image in a peripheral portion of the specified display area and displays the specified display area and the image in the display unit such that the specified display area is included in a display field of the display unit based on the received information indicative of the specified display area and information about the display field of the display unit.

According to an embodiment of the present invention, it is possible to provide an information processing apparatus for facilitating synchronization of display screens between a plurality of terminals having different directions of display screens, different aspect ratios, or the like.

BRIEF DESCRIPTION OF THE DRAWINGS

Other objects and further features of embodiments will become apparent from the following detailed description when read in conjunction with the accompanying drawings, in which:

FIG. 5 is a diagram illustrating an example of a synchronization message for a display screen according to an embodiment;

DESCRIPTION OF THE PREFERRED EMBODIMENTS

In the following, embodiments of the present invention will be described with reference to the accompanying drawings.

<System Configuration>

Figure 1:
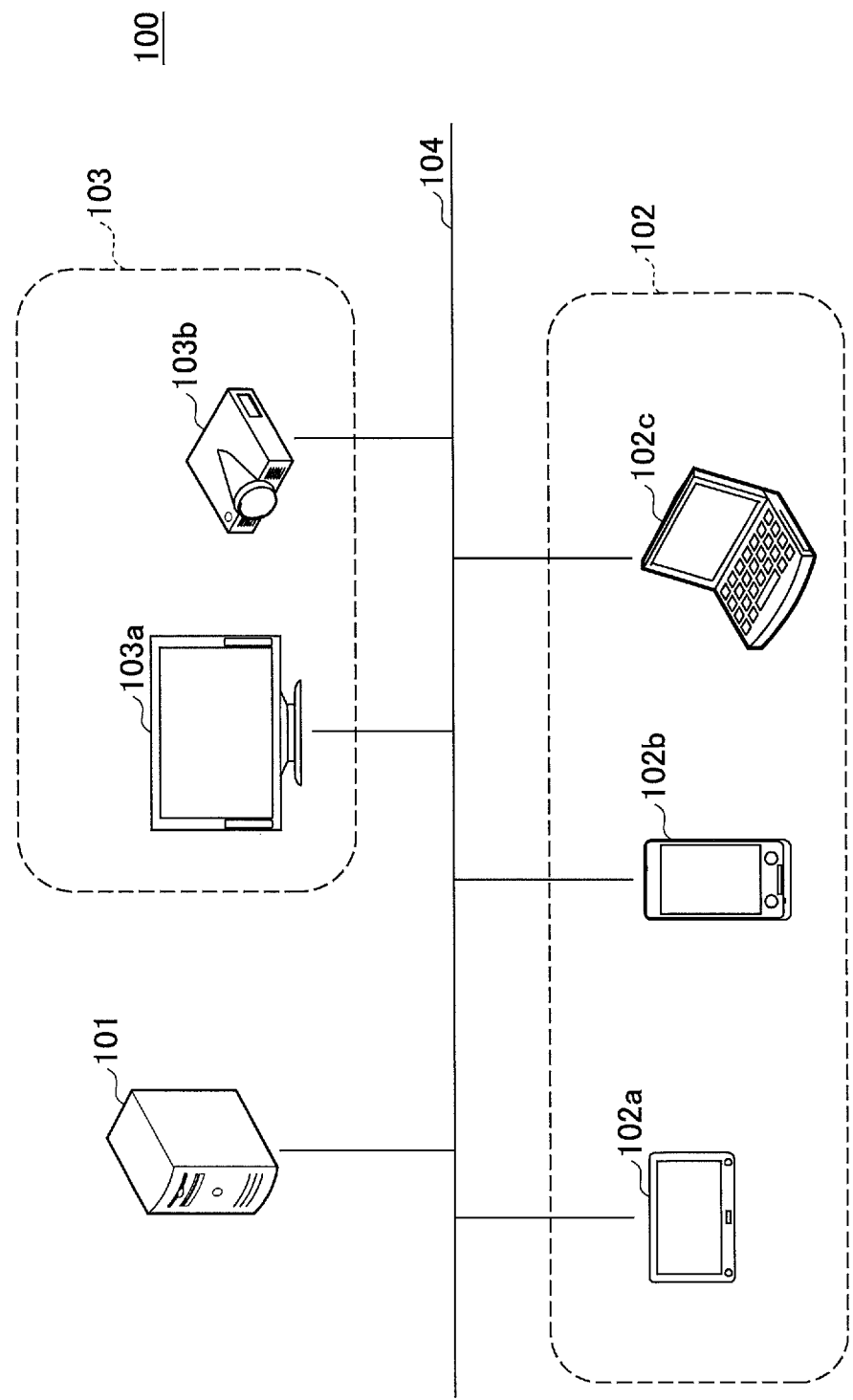
FIG. 1 is a diagram illustrating an example of a conference system according to an embodiment of the present invention.

FIG. 1 is a diagram illustrating an example of a conference system according to an embodiment of the present invention. A conference system 100 includes a conference server device 101 and a plurality of conference client devices 102, the conference server device 101 and the conference client devices 102 being connected to a network 104 such as a Local Area Network (LAN) in a company or the Internet. The conference system 100 may include at least one conference display device 103 disposed in a conference room to browse a shared display on a large screen. The conference system 100 is an example of an information processing system according to the present invention.

The conference server device 101 is a server for managing conference information, conference materials, and participants of a conference, for example. A user holding the conference can register conference information about the date and time of the conference to be held, a place, participants, a topic, materials to be distributed, and the like with the conference server device 101. Users who will participate in the conference can obtain, from the conference server device 101, information such as the conference information and the materials to be distributed.

The conference client device 102 is a terminal device for performing an operation necessary to proceed with a conference and for browsing the conference materials. The conference client device 102 may be an information processing apparatus (image processing device) such as a tablet terminal 102a, a smart phone 102b, or a Personal Computer (PC) 102c. An arbitrary number of conference client devices 102 may be included in any combination. The conference client device 102 may include an image forming device such as a multifunction peripheral or a printer, a projection device such as a projector, a terminal device dedicated to conferences, an electronic blackboard, or the like.

The conference display device 103 is a display device such as a display 103a, a projector 103b, or the like.

A user involved in a conference using the conference system 100 starts up a conference client application for the conference system 100 from each conference client device 102 and participates in the conference, for example.

The conference system 100 has a screen sharing function for setting any one of the plurality of conference client devices 102 as a presenter's terminal and rendering display of a presenter's terminal on a display screen of other conference client device 102 and/or the conference display device 103.

For example, a user participating in the conference downloads target data such as the conference materials registered in the conference server device 101 or the like and stores the target data in a memory unit or the like of his own device in advance. In the conference system 100, the conference client device 102 synchronizes its operation on the target data with an operation on the target data by other conference client device 102 by transmitting to and receiving from the conference server device 101 operation information to specify a display area of the target data. Each conference client device 102 renders a shared display based on the target data stored in the memory unit and the received information to specify the display area.

When the conference client device 102 according to the embodiment receives the information to specify the display area of the target data, the conference client device 102 scales the specified display area and an image in a peripheral portion of the display area and renders display such that an image in the specified display area is included in a display field of a display unit. In this case, the conference client device 102 scales the display area of the target data and the image in the peripheral portion thereof while maintaining an aspect ratio (horizontal to vertical ratio) of the image in the specified display area.

In a preferred example, the conference client device 102 displays the display area and the image in the peripheral portion thereof at maximum magnification such that an image in the display area is included in the display field. In accordance with this, in the conference system 100, it is possible to include the display area of target data and to display the display area and the image in the peripheral portion thereof in a suitable size in the plurality of conference client devices 102 having different directions of display screens, different aspect ratios, or the like.

According to the above-mentioned configuration, each conference client device 102 may have any direction of the display screen and any aspect ratio, for example. Accordingly, each participant can arbitrarily change the direction of the display screen of the conference client device 102 such as a tablet terminal during the conference.

Further, not only the display area of the target data but also the image in the peripheral portion thereof are scaled, so that if a horizontally long display area is displayed in a vertically long display field, for example, it is possible to display the image in the peripheral portion of the display area in a dead space of the display field.

In this manner, the conference client device 102 (information processing apparatus) according to this embodiment is capable of facilitating synchronization of display screens between a plurality of terminals having different directions of display screens, different aspect ratios, or the like.

<Hardware Configuration>

Figure 2:
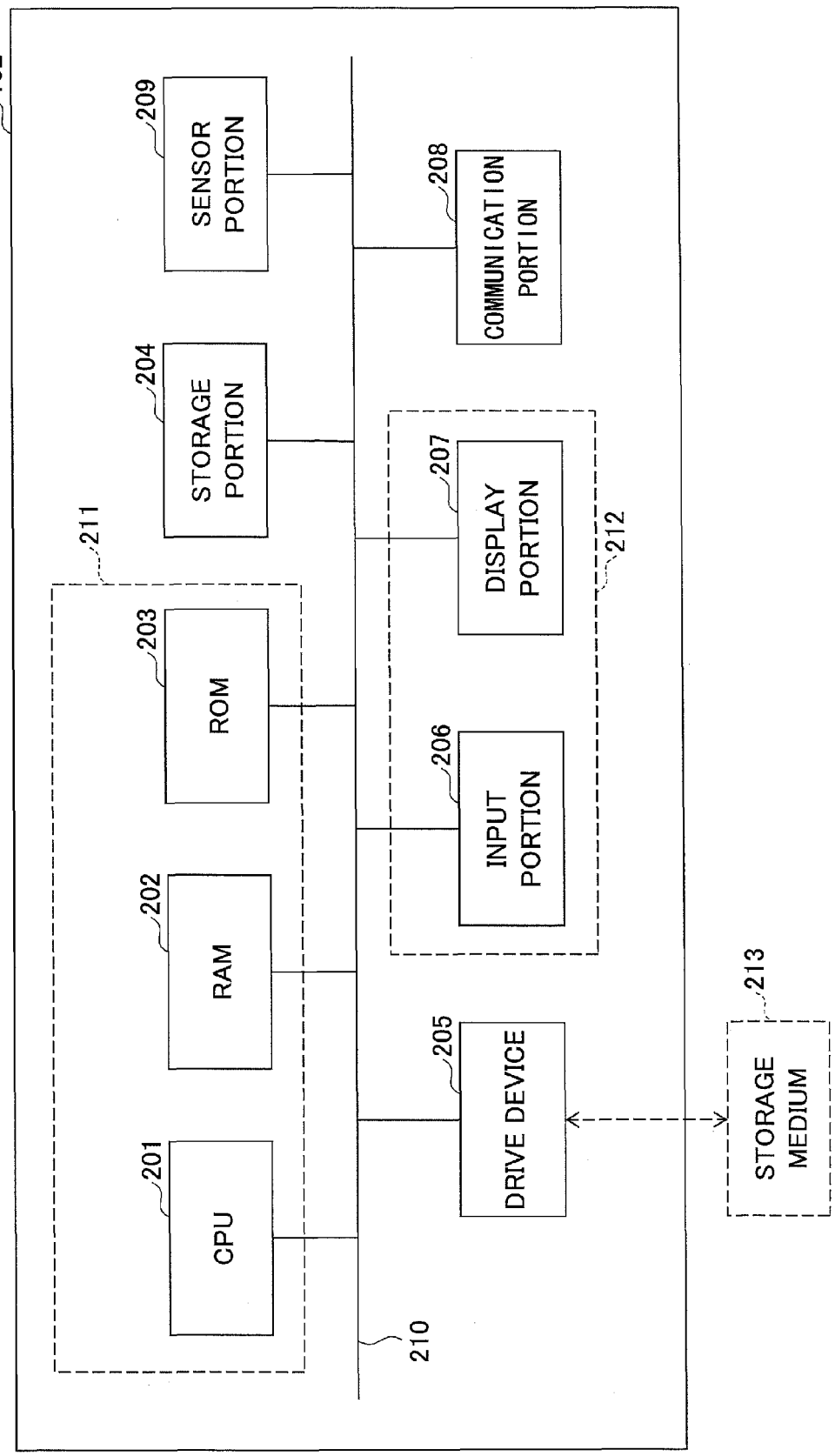
FIG. 2 is a configuration diagram of hardware of a conference client device according to an embodiment.

FIG. 2 is a configuration diagram of hardware of the conference client device 102 according to an embodiment. The conference client device 102 is an example of an information processing apparatus according to the present invention. The conference client device 102 has a configuration of a general computer and includes a Central Processing Unit (CPU) 201, a Random Access Memory (RAM) 202, a Read-Only Memory (ROM) 203, a storage portion 204, a drive device 205, an input portion 206, a display portion 207, a communication portion 208, a sensor portion 209, a system bus 210, and the like.

The CPU 201 is an arithmetic unit that controls an entire portion of the conference client device 102 by executing a program stored in the ROM 203, the storage portion 204, or the like. The RAM 202 is a volatile memory used as a work area of the CPU 201. The ROM 203 is a nonvolatile memory capable of holding internal data even in a powered-off state. The ROM 203 stores a Basic Input/Output System (BIOS) executed when the conference client device 102 is initiated, a program and data such as various types of setting information, and the like. The CPU 201, the RAM 202, and the ROM 203 control the entire portion of the conference client device 102 as a control portion 211, for example.

The storage portion 204 includes a Hard Disk Drive (HDD), a storage device such as a Solid State Drive (SSD) or a flash ROM, and a control portion thereof. The storage portion 204 stores an Operating System (OS), programs such as various types of application, and data such as conference materials.

The drive device 205 is an interface to a removable storage medium 213. The conference client device 102 can read and/or write on the storage medium 213 via the drive device 205.

The input portion 206 includes an input device such as a keyboard, a mouse, or a touch panel, and a control portion thereof. The display portion 207 includes a display device such as a Liquid Crystal Display (LCD) and a control portion thereof. The input portion 206 and the display portion 207 may be a display inputting portion 212 such as an integrated touch panel display.

The communication portion 208 is a communication interface for connecting the conference client device 102 to the network 104 or the like. The conference client device 102 can communicate with the conference server device 101 and other conference client device 102, for example, via the communication portion 208. The communication portion 208 includes an interface portion for a wired/wireless LAN, mobile communications, or the like, and a control portion thereof.

The sensor portion 209 is a sensor for detecting inclination or the like of the conference client device 102 or the display portion 207 of the conference client device 102. If the conference client device 102 is a tablet terminal or a smart phone, for example, it is possible to determine the switching between a vertically long screen and a horizontally long screen based on a signal output from the sensor portion 209. The system bus 210 is a bus for transferring an address, a data signal, and various types of control signals.

The hardware configuration shown in FIG. 2 is only an example. The conference client device 102 may include other elements such as a camera, a speaker, a microphone, or the like.

The conference client device 102 according to an embodiment can provide various types of function as the conference client device 102 in accordance with the above-mentioned hardware configuration.

The conference display device 103 shown in FIG. 1 is assumed to have the same configuration as in the conference client device 102 shown in FIG. 2. For example, if the conference display device 103 is the projector 103b, the display portion 207 shown in FIG. 2 projects an image. A signal output from the sensor portion 209 is used to detect inclination or the like of the conference display device 103 and perform various types of correction such as keystone correction.

<Functional Configuration>

Figure 3:
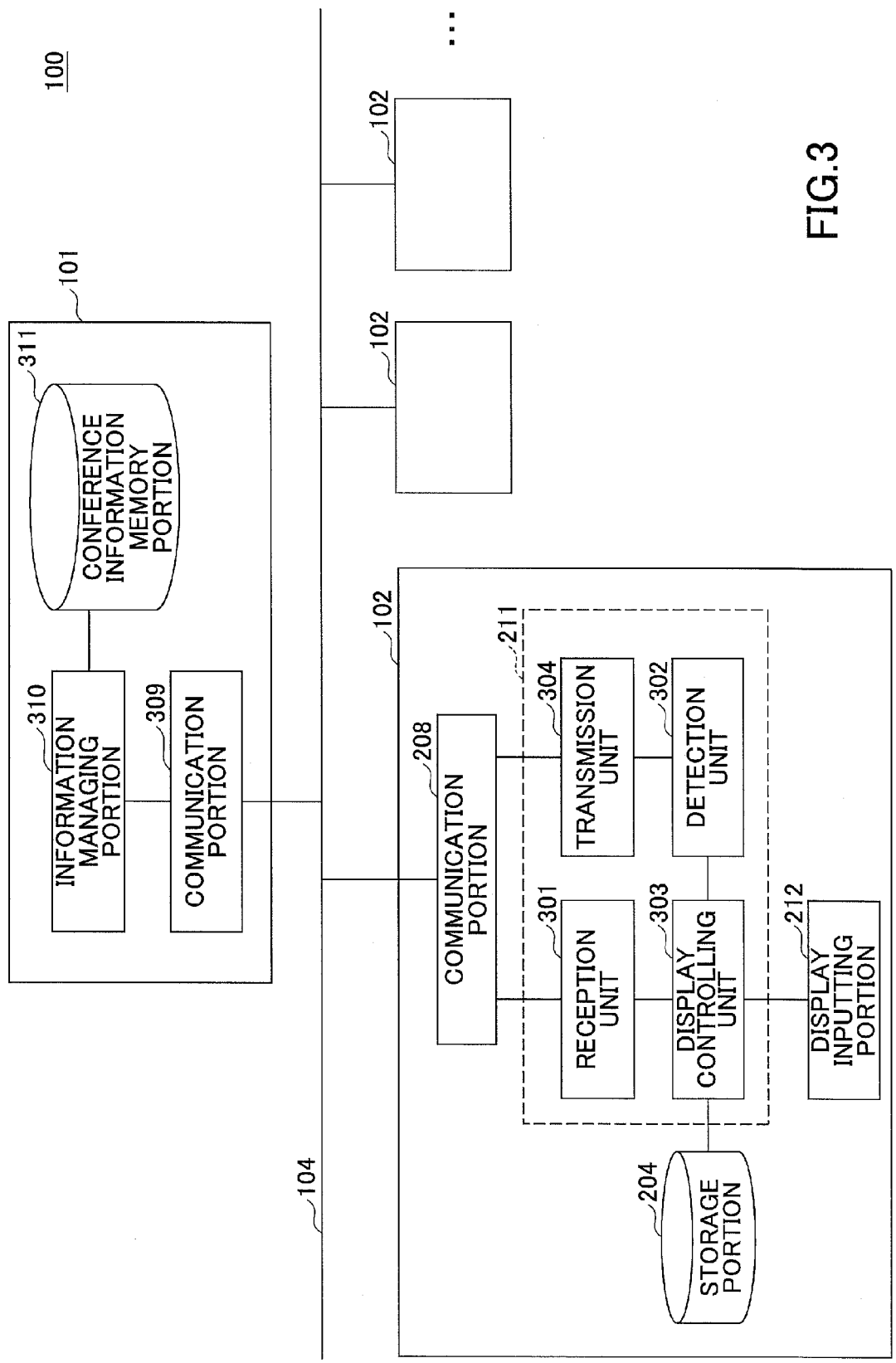
FIG. 3 is a configuration diagram of functions of a conference system according to an embodiment.

FIG. 3 illustrates a functional configuration of the conference system 100 according to an embodiment.

(Functional Configuration of a Conference Client Device)

In FIG. 3, each of the plurality of conference client devices 102 includes a reception unit 301, a detection unit 302, a display controlling unit 303, a transmission unit 304, the display inputting portion 212, the storage portion (memory unit) 204, the communication portion 208, and the like.

The reception unit 301 receives, via the communication portion 208, information to specify a display area of target data such as conference materials to be shared with another information processing apparatus and notifies the information to the display controlling unit 303. The display area of the target data is information that indicates an area of the target data displayed on a presenter's conference client device 102 (hereafter referred to as presenter's terminal). The display area can be represented using a display page of the target data, coordinates (X-coordinate and Y-coordinate) of an origin, width, height, and the like. The coordinates indicating the display area employ information about a logical coordinate system of the target data. For example, in the present embodiment, the target data is assumed to be in Portable Document Format (PDF) form and the coordinates indicating the display area are assumed to employ information indicating a logical coordinate system using CropBox of PDF. In other words, the information indicating the logical coordinate system using CropBox of PDF does not depend on a device to display PDF because the information is about logical coordinates defined in advance for PDF.

The PDF is an example of the target data and the target data may be data in other format. Further, the CropBox is an example of the display area. The display area may be other information as long as the information does not depend on a device to display the target data and can uniquely specify an area of the target data. For example, information such as ViewBox in Scalable Vector Graphics (SVG) format or ContentBox in XML Paper Specification (XPS) format can be used as the target data and a display area thereof.

The detection unit 302 detects a display field of the display unit. The display field of the display unit includes a field of a screen for displaying target data such as conference materials in the conference client device 102. For example, if an application of the conference client device 102 is a Web browser, the display field of the display unit does not have a size of the display portion 207, the display inputting portion 212, or the like but has a size of a portion where the target data is displayed on the Web browser. The display field of the display unit to be detected by the detection unit 302 is represented by a logical coordinate system of a participant's terminal.

If a change occurs in the display field including cases where a direction of a participant's terminal is changed, a size or an aspect ratio of the display field is changed, and the like, the detection unit 302 notifies the changed display field to the display controlling unit 303.

The detection unit 302 also detects a change of the display area in a presenter's terminal. For example, the detection unit 302 obtains information about the changed display area if the presenter performs a scaling operation, and notifies the information to the transmission unit 304.

The display controlling unit 303 scales and displays the display area of the target data and an image in a peripheral portion thereof on the display unit such that an image in the display area is included in the display field in a participant's terminal depending on the notified display area or the detected change of the display field. In this case, the display controlling unit 303 scales the display area of the target data and the image in the peripheral portion thereof while maintaining an aspect ratio (horizontal to vertical ratio) of the image in the display area.

Further, the display controlling unit 303 performs a process to convert the logical coordinate system of a participant's terminal into the logical coordinate system of the target data. While conversion of the logical coordinate system of the target data into a physical coordinate system is assumed to be performed by a system library (OS) of a participant's terminal, the display controlling unit 303 may perform the conversion.

In a preferred example, the display controlling unit 303 scales the display area of the target data and the image in the peripheral portion thereof such that two opposite sides of the image in the display area of the target data are in contact with two opposite sides of the display field of the display unit. In other words, the display controlling unit 303 displays the display area and the image in the peripheral portion thereof at a maximum magnification within an area where the image in the display area is included in the display field.

Further, in another preferred example, the two opposite sides in the display area and the sides in the display field may be brought into proximity to one another with a predetermined margin rather than having a complete correspondence. For example, display may be rendered at 98%, 95%, or 90% of the maximum magnification, for example.

The display controlling unit 303 on a presenter's terminal also performs control to display the display area of the target data in the display unit depending on a scaling operation by the presenter, a change of the terminal, and the like.

The transmission unit 304 notifies, if a change occurs in the display area in a presenter's terminal, a new display area to a participant's terminal using a synchronization message for scaling described later. The change which occurs in the display area refers to a change of the display area detected by the detection unit 302 including cases where the presenter performs an operation to scale the display area, the presenter changes a direction of a presenter's terminal, and the like.

The storage portion 204 is a memory unit that stores target data such as conference materials. In this embodiment, the participant obtains the target data registered in the conference server device 101 before a conference starts and stores the target data in the memory unit such as the storage portion 204, for example. A participant's terminal can display the display area of the target data and a peripheral portion thereof based on the target data stored in the memory unit and information obtained indicating the display area. The memory unit that stores the target data may be an external memory unit such as a server, a cloud, or a USB memory.

The reception unit 301, the detection unit 302, the display controlling unit 303, and the transmission unit 304 mentioned above are implemented by a program (image processing program) operating in the control portion 211, for example. The program for causing the conference client device 102 to function as the reception unit 301, the detection unit 302, the display controlling unit 303, the transmission unit 304, and the like can be stored in the computer-readable storage medium 213, for example. Accordingly, the above-mentioned program can be installed on the conference client device 102 via the drive device 205.

While the reception unit 301 and the transmission unit 304 are implemented by the program operating in the control portion 211 in the above-mentioned description, the reception unit 301 and the transmission unit 304 may be included in the communication portion 208, for example.

(Functional Configuration of a Conference Server Device)

In FIG. 3, the conference server device 101 includes a communication portion 309, an information managing portion 310, a conference information memory portion 311, and the like.

The communication portion 309 includes a network interface for communicating with the conference client device 102, the conference display device 103, and the like via the network 104 and a control portion thereof. The communication portion 309 transfers various types of messages, data, and the like transmitted and received among a plurality of conference client devices 102.

The information managing portion 310 manages conference information such as a title of a conference held using the conference system 100, conference materials, date and time of the conference to be held, and attendants. The conference information memory portion 311 is a memory portion such as a storage that stores the above-mentioned conference information.

The conference server may be divided into a plurality of servers for each function.

<Processing Flow of the Conference System>

Figure 4:
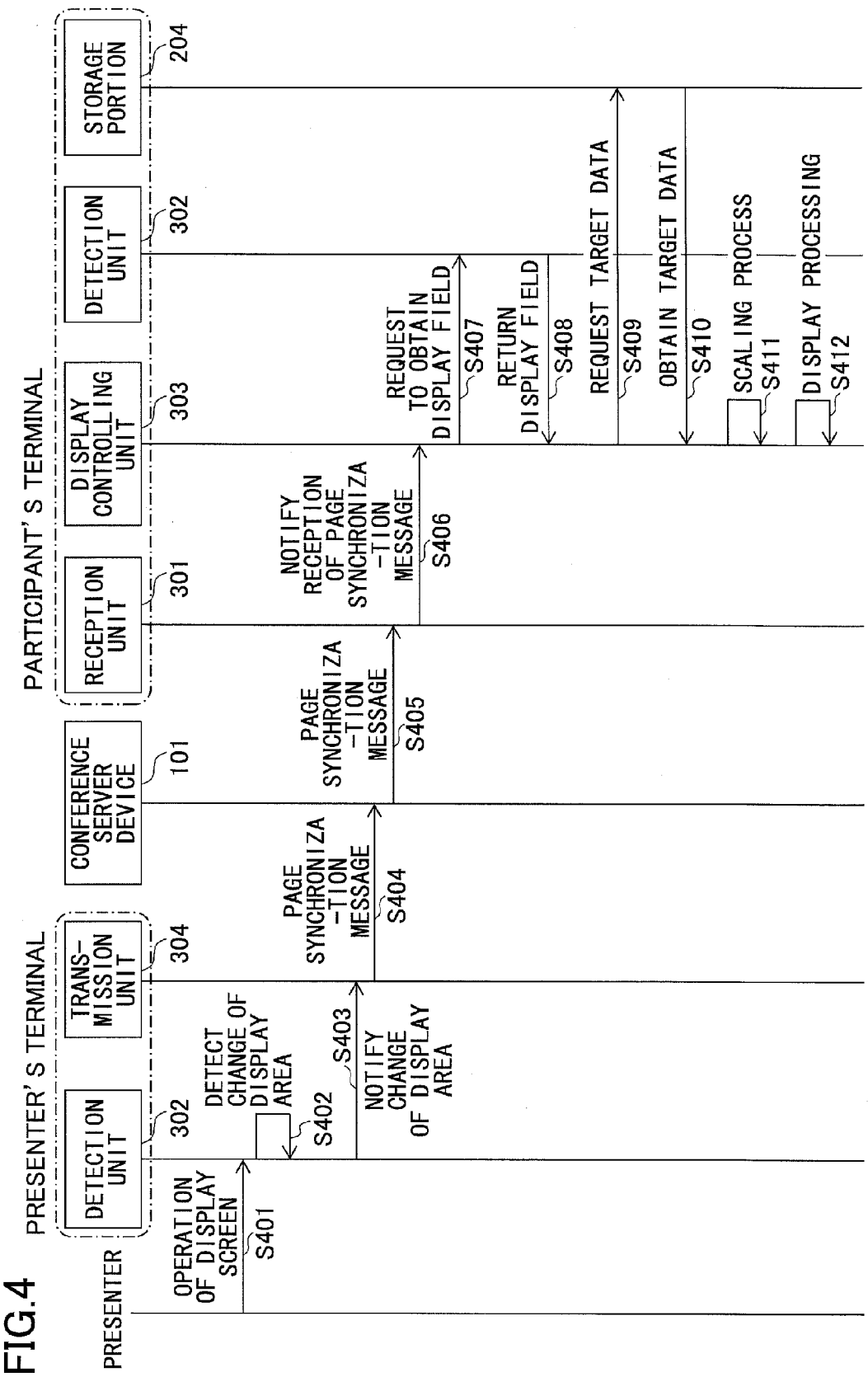
FIG. 4 is a sequence diagram of a synchronization process of a display screen of a conference system according to an embodiment.

FIG. 4 is a sequence diagram of a synchronization process of a display screen of a conference system according to an embodiment. In the following description, a conference client device 102 only capable of browsing materials is referred to as a participant's terminal (a first information processing apparatus) and another conference client device 102 capable of performing page flipping, scaling up or down, changing the materials, and the like is referred to as a presenter's terminal (a second information processing apparatus). The conference system 100 is assumed to include one presenter's terminal and at least one participant's terminal. Further, the conference system 100 is assumed to be capable of causing a given conference client device 102 to function as a presenter's terminal by a predetermined operation.

In FIG. 4, when a presenter uses a presenter's terminal to perform an operation on a display screen such as scaling or page flipping (step S401), the detection unit 302 of a presenter's terminal detects a change of the display area (step S402). The operation on the display screen may be a scrolling operation, if touch panel input is possible, a pinch-in or pinch-out operation, a swipe operation, a flick operation, a double-tap operation, and the like.

The detection unit 302 that has detected the change of the display area notifies the change of the display area to the transmission unit 304 (step S403). The transmission unit 304 receives the notification and transmits a page synchronization message including information to specify the display area to the conference server device 101 (step S404). The transmission unit 304 may transmit the page synchronization message including the information to specify the display area to a participant's terminal without using the conference server device 101.

In the present embodiment, while it is assumed that Extensible Messaging and Presence Protocol (XMPP) is used to transmit and receive a synchronization message such as the page synchronization message for the display screen, other communications protocol may be used.

The conference server device 101 receives the page synchronization message from the presenter's terminal and transfers the received page synchronization message to at least one participant's terminal (step S405).

When the reception unit 301 of a participant's terminal receives the page synchronization message, the reception unit 301 notifies the reception of the page synchronization message to the display controlling unit 303 (step S406). The display controlling unit 303 receives the notification and obtains a display field of the display unit from the detection unit 302 (steps S407, S408). The display controlling unit 303 also obtains target data from the storage portion 204 depending on a specified display area (steps S409, S410). In this case, if there is no need to obtain new data in a case where page numbers have not been changed, for example, the display controlling unit 303 may omit processing steps S409 and S410.

The display controlling unit 303 scales the specified display area of target data and an image in a peripheral portion of the display area stored in the memory unit such as the storage portion 204 such that an image in the specified display area is included in the display field detected by the detection unit (step S411). In this case, the display controlling unit 303 scales the image in the display area while maintaining an aspect ratio (horizontal to vertical ratio) of the image in the display area. Further, the display controlling unit 303 scales the display area of the target data and the image in the peripheral portion thereof stored in the memory unit such that two opposite sides of the image in the display area are in contact with two opposite sides of the display field.

Next, the display controlling unit 303 displays a scaled-up or scaled-down image on the display unit (step S412).

In accordance with the above-mentioned process, a participant's terminal is capable of scaling the display area and the image in the peripheral portion of the display area and displaying them on the display unit such that the image in the display area is included in the display field of the display unit depending on the information to specify the display area from the presenter's terminal.

In the following, a synchronization message for the display screen including a page synchronization message is described.

FIG. 5 is a diagram illustrating an example of the synchronization message for the display screen according to an embodiment. A synchronization message 500 for the display screen includes information such as conference identification (ID) 501, a message ID 502, a request Globally Unique Identifier (GUID) 503, date and time 504, a material ID 505, a page number 506, and synchronization data 507.

The conference ID 501 is identification information to identify a conference. In the network 104, since a plurality of conferences may be held in parallel, the conference server device 101 assigns a different conference ID 501 to each conference and manages the conferences. The conference client device 102 attaches a predetermined conference ID to transmission data to be used in a conference and transmits the transmission data. The conference client device 102 also verifies the conference ID 501 upon receiving the data to be used in the conference and processes data having the predetermined conference ID 501.

The message ID 502 is information to identify types of synchronization messages 500. In FIG. 5, if a value of the message ID 502 is "100", this indicates that the synchronization message 500 is a "page synchronization (scaling, page flipping) message". If the value of the message ID 502 is "200", this indicates that the synchronization message 500 is a "handwritten memorandum synchronization message".

The request GUID 503 is identification information used to identify from all synchronization messages (requests) 500 used in conferences. The GUID is an ID generated to be a globally unique value and is represented by a 128 bit value, for example.

The date and time 504 is information indicative of a date and time of transmission of a message and the like. The material ID 505 is identification information to specify target data to be displayed on the conference client device 102. The page number 506 indicates a display target page of the target data.

The synchronization data 507 is data (information) used for page synchronization and handwritten memorandum synchronization.

For example, if the synchronization message 500 is a page synchronization message, the synchronization data 507 is information indicative of a display area of target data. The display area of the target data includes information about "x0", "y0" indicating coordinates of an origin of the display area, "w" indicating a lateral width of the display area in an x-axis direction, "h" indicating a longitudinal width (height) of the display area in a y-axis direction, and the like. The synchronization data 507 is information to enable unique calculation of the display area of the target data.

Further, if the synchronization message 500 is a handwritten memorandum synchronization message, the synchronization data 507 is information indicative of drawing data on a handwritten memorandum. The drawing data on the handwritten memorandum is represented by stroke information indicating a color and a thickness of the handwritten memorandum, information about a plurality of points indicating an X-coordinate and a Y-coordinate of each point in the handwritten memorandum, and the like. The stroke information and the information about the plurality of points represent a line segment or a curve shown in the handwritten memorandum.

In addition, each process in the present embodiment is performed using the logical coordinate system of the target data such as a logical coordinate system of PDF data.

When a participant's terminal receives a synchronization message 500 for the display screen, the synchronization message 500 having a predetermined conference ID 501 and a message ID 502 whose value is "100", for example, a participant's terminal determines the synchronization message 500 to be a page synchronization message and performs processing from step S407 in FIG. 4, for example.

The synchronization message shown in FIG. 5 is only an example. The page synchronization message shown in FIG. 5 may be divided into a plurality of messages including scaling, page flipping, and the like. For example, the messages may include a scale-up message (message ID: 100), a scale-down message (message ID: 200), a scrolling message (message ID: 300), a page flipping message (message ID: 400), a handwritten memorandum message (message ID: 500), and the like.

Next, a scaling process depending on a direction of the display screen of a participant's terminal is described.

Figure 6:
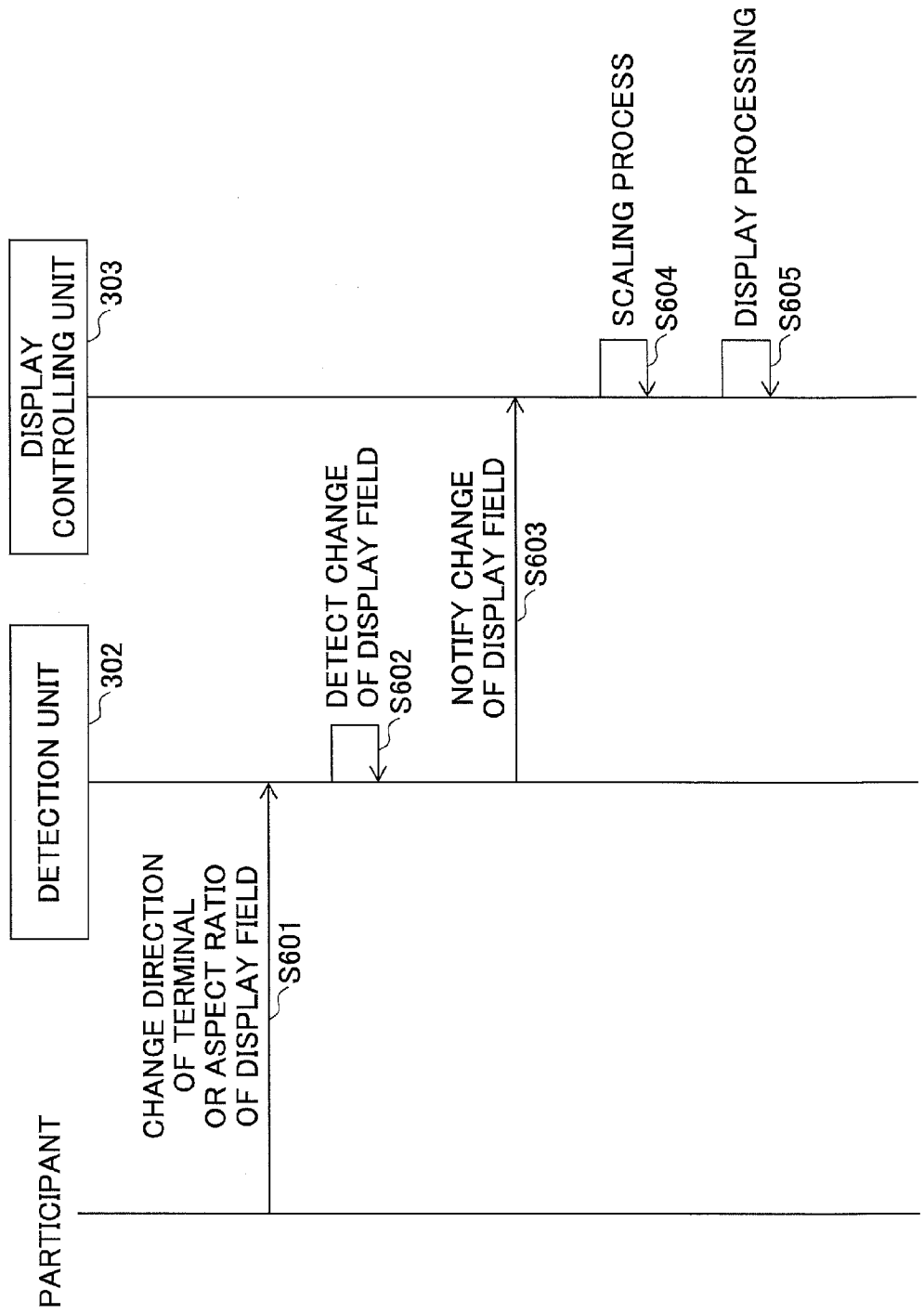
FIG. 6 is a sequence diagram of a scaling process depending on a direction of a display screen of a participant's terminal according to an embodiment.

FIG. 6 is a sequence diagram of the scaling process depending on the direction of the display screen of a participant's terminal according to an embodiment.

If a participant's terminal is a tablet device or a smart phone, an aspect ratio of a display field is changed when the direction of the terminal is changed from a longitudinal direction to a lateral direction, for example. If a participant's terminal is a PC, for example, resolution and an aspect ratio of a display field are changed when a window size of an application in a conference client is changed. Here, descriptions are given on the assumption that a participant's terminal is a tablet terminal.

In FIG. 6, if a participant changes the aspect ratio of the display field by changing the direction of a participant's terminal from the longitudinal direction to the lateral direction, for example (step S601), the detection unit 302 detects the change of the aspect ratio of the display field (step S602). When the detection unit 302 detects the change of the display field, the detection unit 302 notifies the changed display field to the display controlling unit 303 (step S603). The display controlling unit 303 receives the notification and scales a display area of target data and an image in a peripheral portion thereof such that an image in the display area is included in the notified display field of the display unit (step S604). In this case, the display controlling unit 303 scales the image in the display area while maintaining an aspect ratio (horizontal to vertical ratio) of the image in the display area. Further, the display controlling unit 303 performs scaling to maximize the image in the display area, for example, such that the display area of the target data is included and an easily viewable size is provided. Next, the display controlling unit 303 displays the scaled image in the display unit (step S605).

<Processing Flow of the Conference Client Device>

Next, a specific flow of processing of the conference client device 102 is described.

Figure 7:
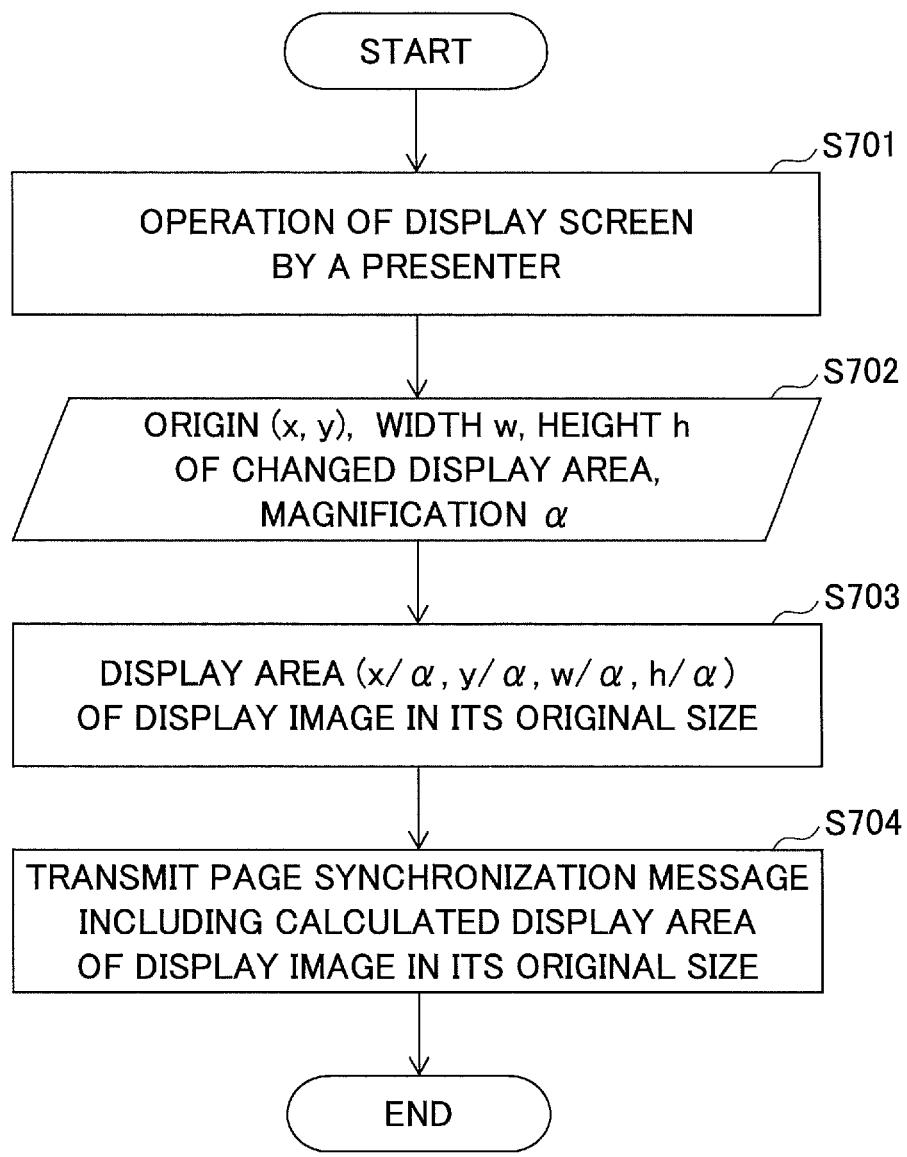
FIG. 7 is a flowchart showing a flow of a synchronization process of a display screen of a presenter's terminal according to an embodiment.

FIG. 7 is a flowchart showing a flow of a synchronization process of a display screen of a presenter's terminal according to an embodiment. When a presenter operates the display screen on a presenter's terminal (step S701), the detection unit 302 of a presenter's terminal detects a change of a display area and obtains information about the changed display area including an origin (x, y), width w, height h, a magnification α, and the like (step S702). The origin (x, y) indicates a reference point of a display target page such as offsets from an upper right corner in an x-axis direction and in a y-axis direction, for example.

The detection unit 302 calculates, from the obtained information, an origin (x/α, y/α) of the display area in a display image (display target page) in its original size, width w/α, height h/α, and the like (step S703) and notifies a result of the calculation to the transmission unit 304.

The transmission unit 304 receives the notification and transmits a page synchronization message including information indicative of the calculated display area (x/α, y/α, w/α, h/α) in the display image in its original size to the conference server device 101 or the like (step S704).

In accordance with the above-mentioned process, the conference client device 102 serving as a presenter's terminal is capable of transmitting a page synchronization message including information to specify a changed display area changed in response to the operation of the display screen by the presenter. The operation of the display screen by the presenter is an example of the operation. For example, if a presenter's terminal is a tablet terminal, the display area in a presenter's terminal is changed when a direction of the terminal is changed from a longitudinal direction to a lateral direction. In such a case, the conference client device 102 serving as a presenter's terminal may transmit a page synchronization message to specify a changed display area in the same manner.

Figure 8:
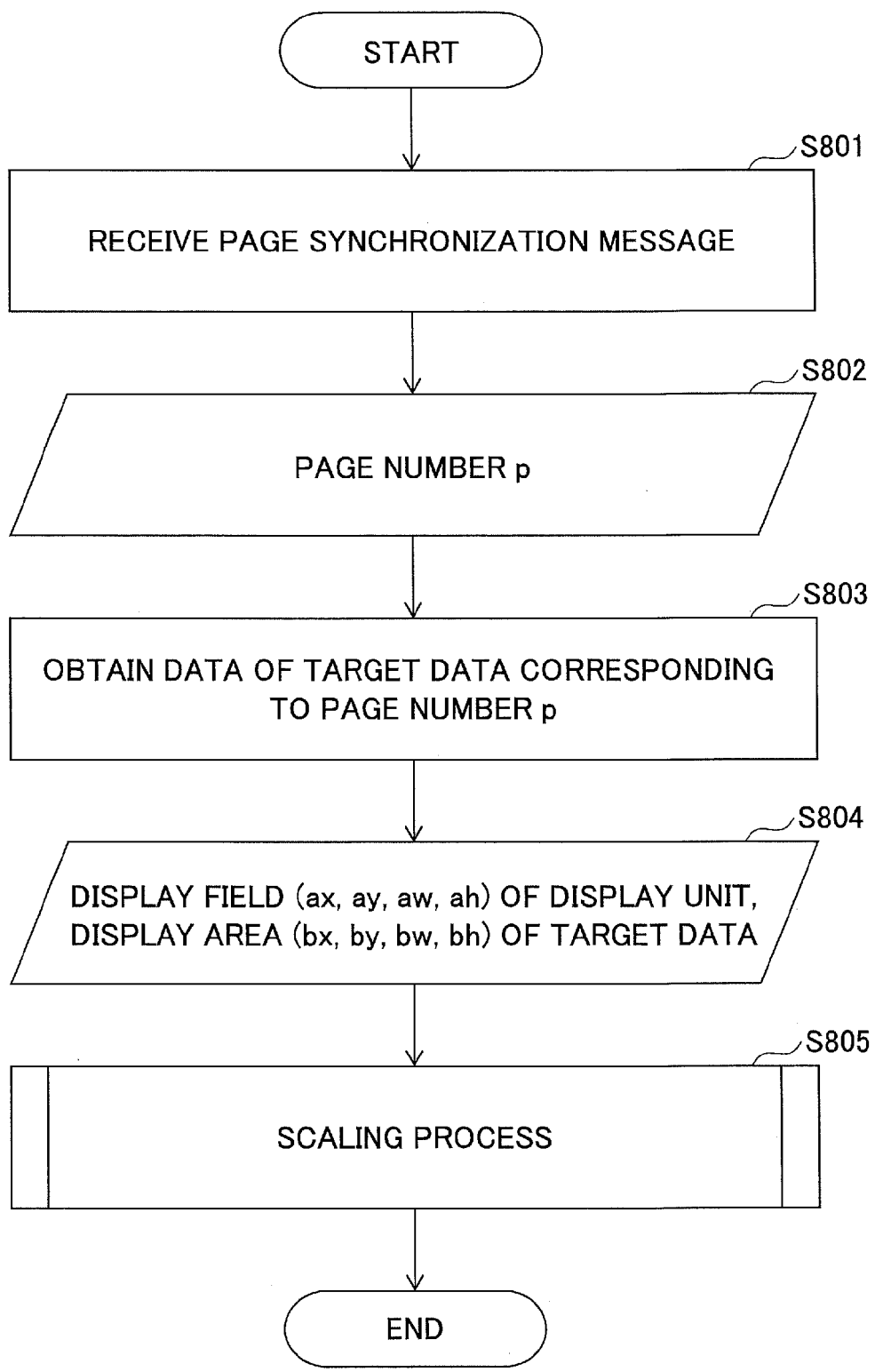
FIG. 8 is a flowchart showing a flow of a synchronization process of a display screen of a participant's terminal according to an embodiment.

FIG. 8 is a flowchart showing a flow of a synchronization process of a display screen of a participant's terminal according to an embodiment. When the reception unit 301 of a participant's terminal receives a page synchronization message including information to specify a display area of target data from the conference server device 101, a presenter's terminal, or the like (step S801), the reception unit 301 notifies received information to the display controlling unit 303. The display controlling unit 303 receives the notification and obtains a page number 506 included in the page synchronization message (step S802) and obtains data of the target data corresponding to the page number 506 from a memory unit such as the storage portion 204, for example (step S803). Further, the display controlling unit 303 obtains a display field (ax, ay, aw, ah) of the display unit from the detection unit 302 and obtains the display area (bx, by, bw, bh) of the target data from the page synchronization message (step S804). Then, the display controlling unit 303 performs a scaling process on the display area of the image data of the obtained page number 506 and an image in a peripheral portion thereof based on the above-mentioned display field and display area such that an image in the above-mentioned display area is included in the display field (step S805).

In accordance with the above-mentioned processing, the conference client device 102 serving as a participant's terminal is capable of performing a predetermined scaling process when receiving information to specify the display area of the target data, namely, when the display area of a presenter's terminal is changed.

Figure 9:
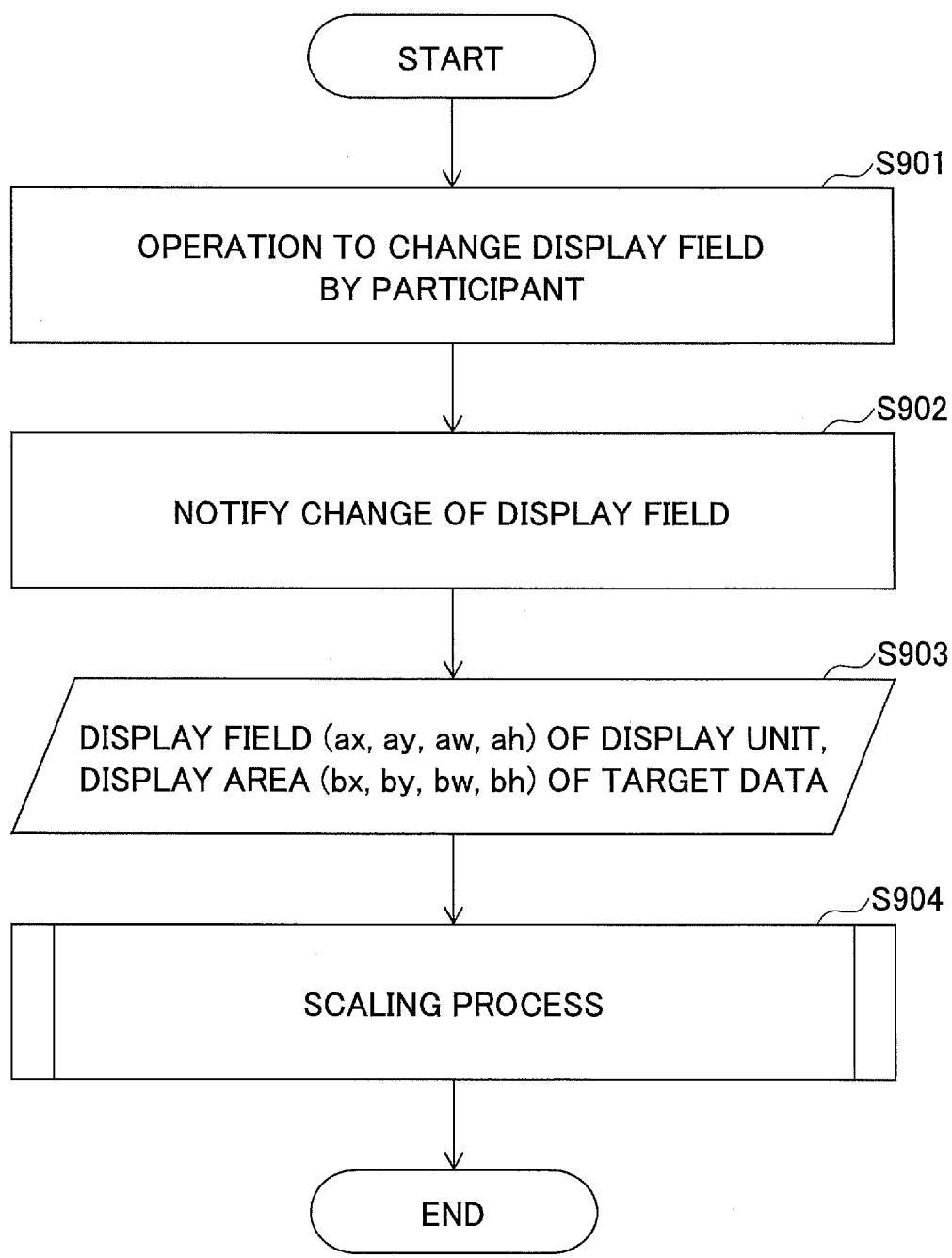
FIG. 9 is a flowchart showing a flow of a scaling process of a participant's terminal in response to an operation by a participant according to an embodiment.

FIG. 9 is a flowchart showing a flow of a scaling process of a participant's terminal in response to an operation by a participant according to an embodiment. When the participant performs an operation to change the display field of a participant's terminal (step S901), the detection unit 302 detects a change of the display field and notifies the change of the display field to the display controlling unit 303 (step S902). The display controlling unit 303 receives the notification, obtains the display field (ax, ay, aw, ah) of the display unit from the detection unit 302, and reads out a current display area (bx, by, bw, bh) of target data (step S903). Then, the display controlling unit 303 performs a scaling process on the current display area and an image in a peripheral portion thereof based on the display field and the display area such that an image in the display area is included in the display field (step S904).

In accordance with the above-mentioned process, when the display field of a participant's terminal is changed, the conference client device 102 serving as a participant's terminal is capable of performing a scaling process such that the current display area is included in the changed display field.

In accordance with processes shown in FIG. 8 and FIG. 9, the conference client device 102 serving as a participant's terminal is capable of performing a scaling process such that the image in the display area is included in the display field depending on a change of the display area of the target data or a change of the display field of the display unit.

Next, an example of a specific scaling process is described with reference to FIG. 10 and FIG. 11.

Figure 10:
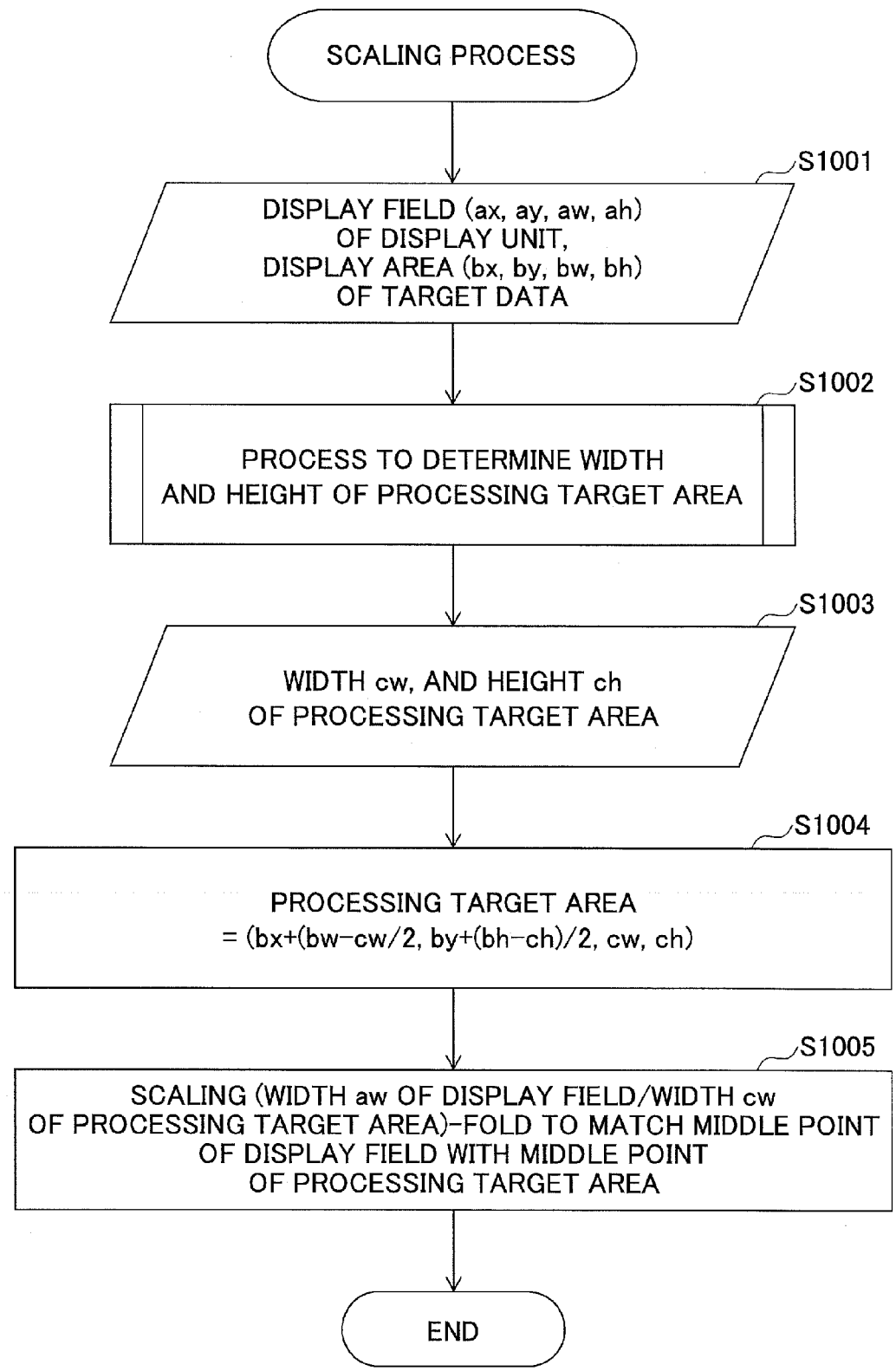
FIG. 10 is a flowchart showing a flow of a scaling process according to an embodiment.

FIG. 10 is a flowchart showing a flow of a scaling process according to an embodiment. The display controlling unit 303 of the conference client device 102 serving as a participant's terminal obtains the display field (ax, ay, aw, ah) of the display unit and the display area (bx, by, bw, bh) of the target data in accordance with the processes shown in FIG. 8 or FIG. 9 (step S1001). The display controlling unit 303 performs a process to determine a width and a height of a processing target area based on obtained information (step S1002). The processing target area indicates an area to be subjected to a scaling process and displayed on the display unit from the display area of the target data and the image in the peripheral portion thereof.

When the width and the height of the processing target area is obtained in accordance with the process in step S1002, the display controlling unit 303 can specify an origin (bx+(bw−cw)/2, by+(bh−ch)/2), a width cw, and a height ch of the processing target area (step S1004).

Next, the display controlling unit 303 matches a middle point of the display field with a middle point of the processing target area and scales an image in the processing target area (width aw of a display screen of a terminal/width cw of the processing target area)-fold (step S1005).

Figure 11:
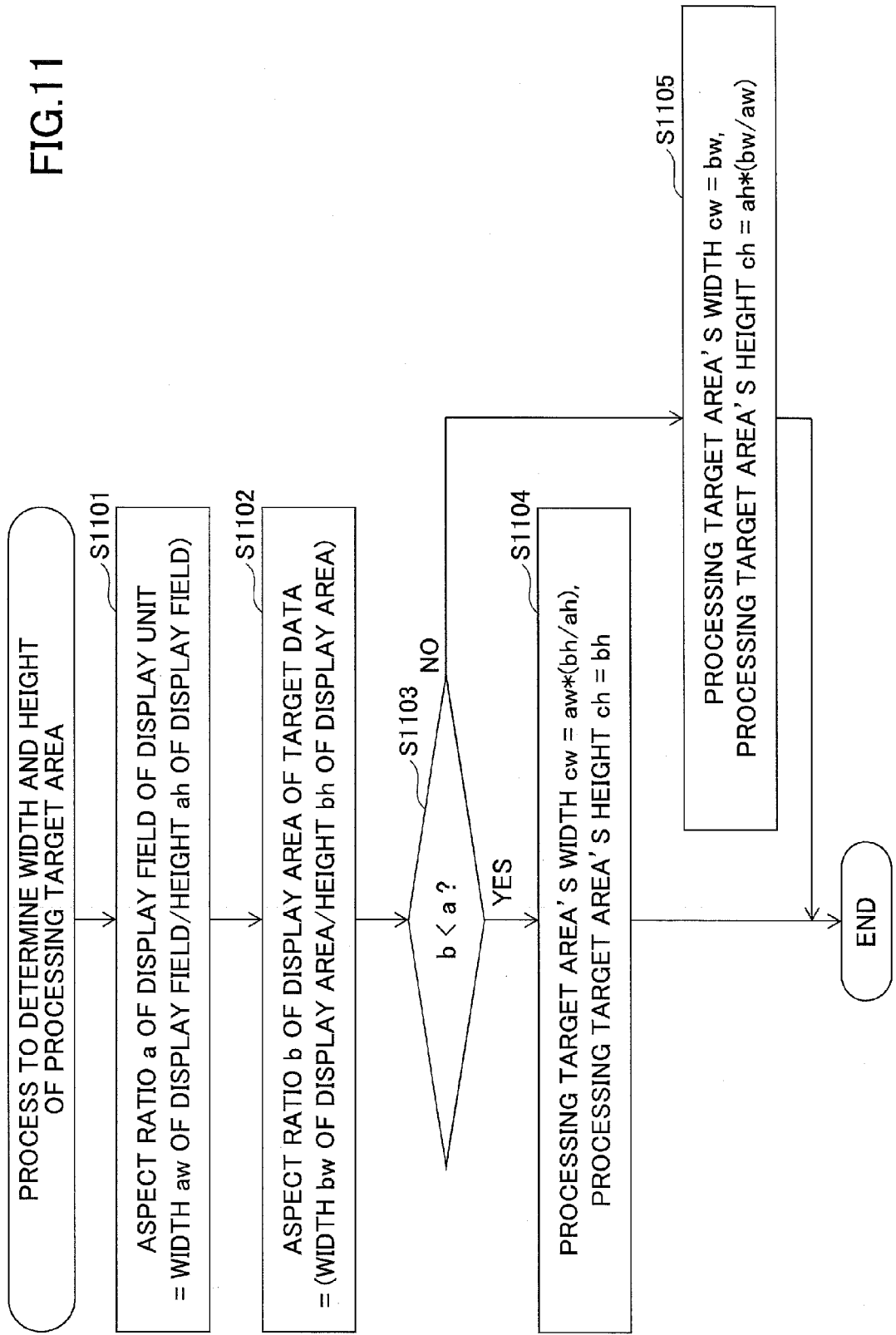
FIG. 11 is a flowchart showing a flow of a process to determine a width and a height of a processing target area according to an embodiment.

FIG. 11 is a flowchart showing a flow of a process to determine the width and the height of the processing target area according to an embodiment. The display controlling unit 303 calculates an aspect ratio a=(width aw of the display field/height ah of the display field) of the display field based on the obtained display field (ax, ay, aw, ah) of the display unit (step S1101). The display controlling unit 303 also calculates an aspect ratio b=(width bw of the display area/height bh of the display area) of the display area based on the display area (bx, by, bw, bh) of the target data (step S1102).

Then, the display controlling unit 303 compares the aspect ratio a of the display field with the aspect ratio b of the display area (step S1103). In step S1103, if the aspect ratio a of the display field is greater than the aspect ratio b of the display area, the height ch of the processing target area is set to the height bh of the display area and the width of the processing target area is defined by cw=aw*(bh/ah) (step S1104).

In step S1103, if the aspect ratio a of the display field is not greater than the aspect ratio b of the display area, the width cw of the processing target area is set to the width bw of the display area and the height of the processing target area is defined by ch=ah*(bw/aw) (step S1105).

In accordance with the above-mentioned process, it is possible to determine the processing target area such that two opposite sides of the display area are in contact with two opposite sides of the processing target area.

<Example of the Display Screen>

Figure 12:
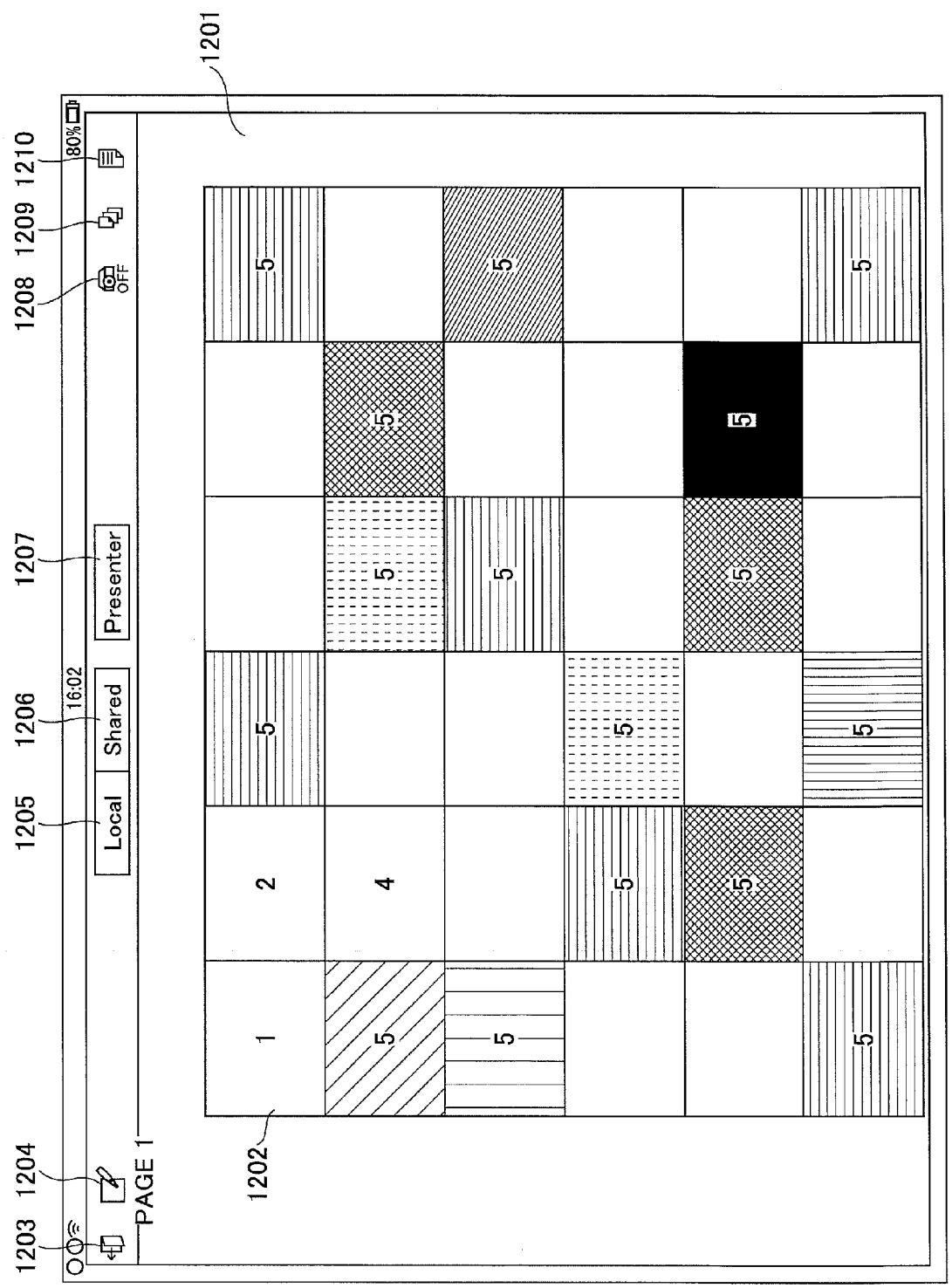
FIG. 12 is a diagram illustrating an example of a display screen when target data is displayed in its original size on a presenter's terminal according to an embodiment.

FIG. 12 is a diagram illustrating an example of a display screen when target data is displayed in its original size on a presenter's terminal according to an embodiment. A configuration of the display screen of a presenter's terminal is described with reference to FIG. 12. In FIG. 12, it is assumed that a presenter's terminal is a tablet terminal and the display field is in a lateral direction.

In FIG. 12, it is assumed that a display field 1201 of the display unit of a presenter's terminal displays target data which is not subjected to a scaling process, namely, an image 1202 of the target data in its original size.

In the screen shown in FIG. 12, if an exit icon 1203 is pressed, the conference client application performs a process to exit from a conference and ends processes related to the conference system 100.

If a handwritten memorandum icon 1204 is pressed, it becomes possible to add a handwritten memorandum to the display field. A Local button 1205 and a Shared button 1206 enable mode switching between a "personal" mode and a "shared" mode for an input handwritten memorandum.

For example, if the presenter presses the Shared button 1206 to select the "shared" mode, the input handwritten memorandum is notified to the conference server device 101 and/or a participant's terminal as additional information to be superimposed and displayed on an image of the target data. The same handwritten memorandum as in a presenter's terminal is also displayed in a participant's terminal using this additional information. If the presenter performs a scaling operation (such as a pinch-out or pinch-in operation on the screen) on the image of the target data, the handwritten memorandum is scaled while a positional relationship with the image of the target data is maintained. Further, if the participant changes the direction of a participant's terminal from the longitudinal direction to the lateral direction, for example, the handwritten memorandum is scaled while the positional relationship with the image of the target data is maintained in the same manner.

If the Local button 1205 is pressed to select the "personal" mode, the input handwritten memorandum is set to be a personal handwritten memorandum and the notification and display in other conference client devices 102 is not performed.

A Presenter button 1207 is for switching presenters. For example, a user of a participant's terminal can request an operation as a presenter's terminal from the conference server device 101 by pressing the Presenter button 1207 of a participant's terminal. The conference server device 101 performs management to mediate requests from a plurality of conference client devices 102 and determine a single presenter's terminal in the conference system 100.

An external projection icon 1208, when it is touched, performs on/off control on an output to an external display unit such as a projector. A page switching icon 1209 is for switching pages to be displayed by the presenter, for example. A material switching icon 1210 is for switching materials to be displayed by the presenter, for example.

Figure 13:
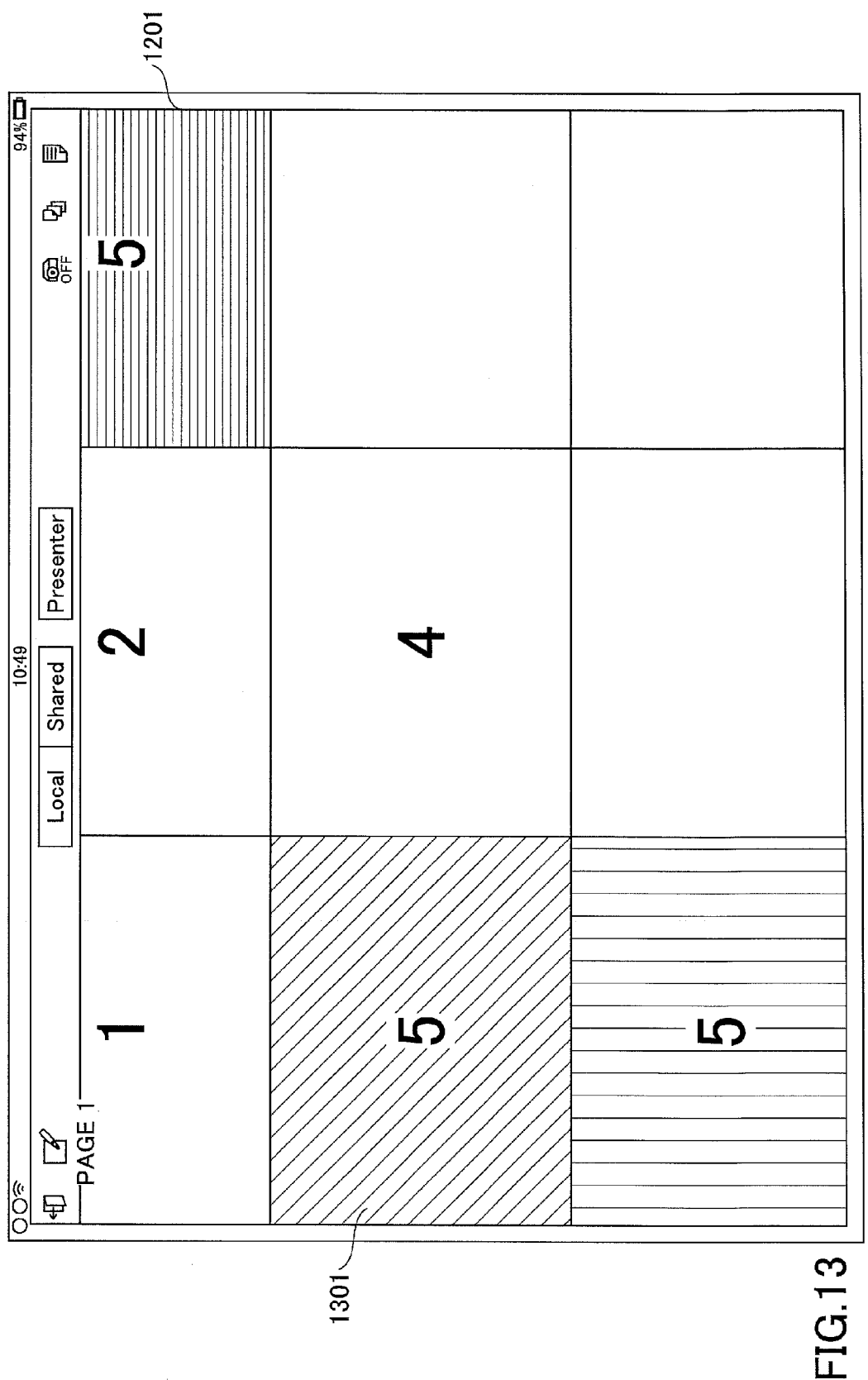
FIG. 13 is a diagram illustrating an example of a display screen when target data is scaled up and displayed on a presenter's terminal according to an embodiment.

FIG. 13 is a diagram illustrating an example of the display screen when target data is scaled up and displayed on a presenter's terminal according to an embodiment. In FIG. 13, a partial image 1301 of the image 1202 of the target data is scaled up and displayed in the display field 1201 of the presenter's terminal. Information indicating an area displayed in the display field 1201 is notified to each of participant's terminals as the display area of the target data using a synchronization message for scaling.

Figure 14:
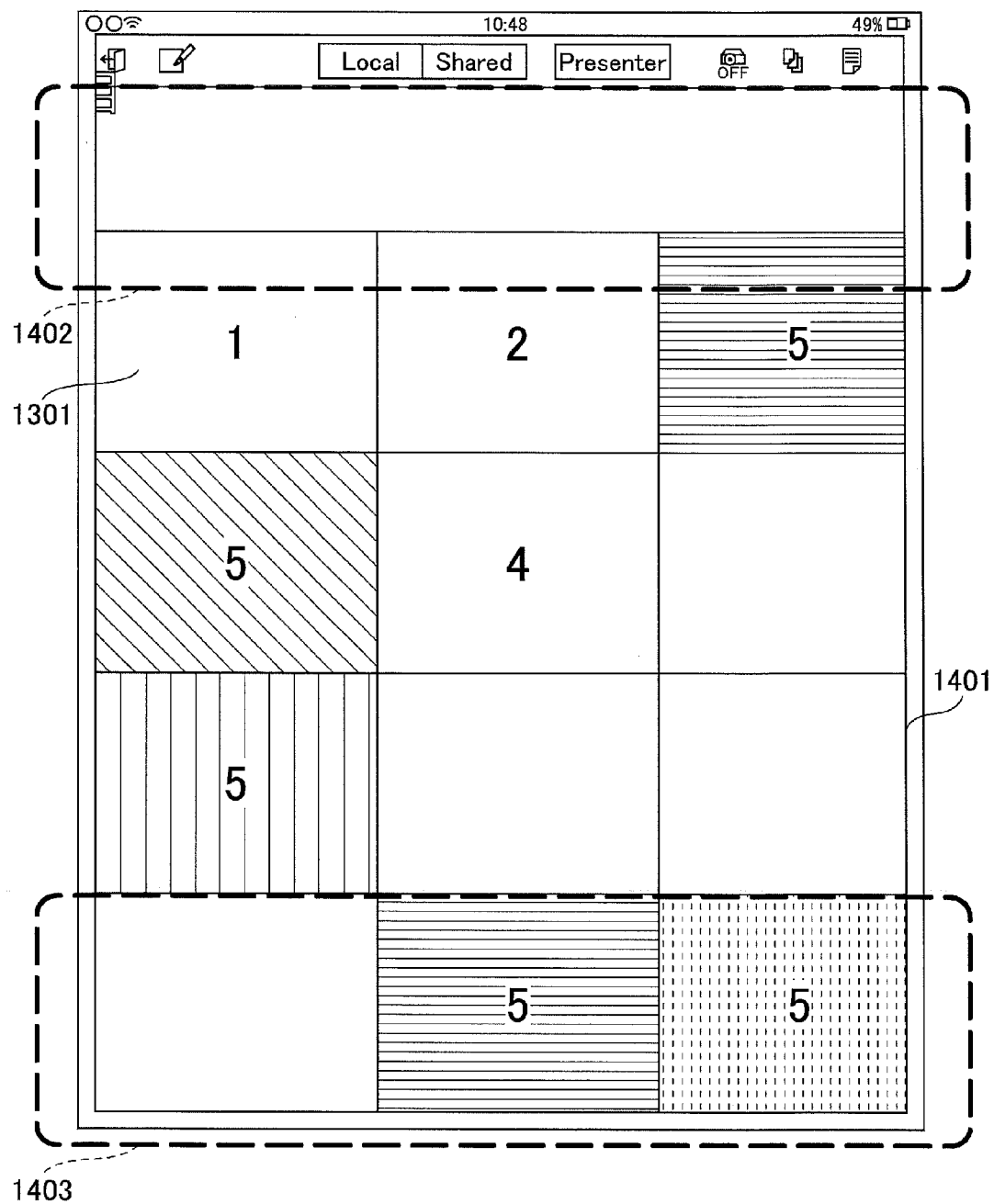
FIG. 14 is a diagram illustrating an example of a display screen of a participant's terminal according to an embodiment.

FIG. 14 is a diagram illustrating an example of the display screen of a participant's terminal according to an embodiment. In FIG. 14, it is assumed that a participant's terminal is the same tablet terminal as a presenter's terminal but the display screen of a participant's terminal has a vertically long screen. If a participant's terminal has a horizontally long screen in the same manner as in a presenter's terminal, an image to be displayed in the display field of a participant's terminal is the same as the image in the display field of a presenter's terminal shown in FIG. 13.

In FIG. 14, the image 1301 of the display area of the target data and images of peripheral portions 1402, 1403 thereof are displayed in a display field 1401 of a participant's terminal such that the image 1301 of the display area is included and maximized. In other words, the display is rendered such that two opposite sides of the image 1301 of the display area are in contact with two opposite sides of the display field 1401. Further, not only the image 1301 of the display area but also the images of the peripheral portions 1402, 1403 thereof are scaled together with the image 1301 of the display area, so that the display area is extended above and below the display area.

For example, in a system for transmitting "image data" in a display area displayed in a presenter's screen to a participant's terminal and displaying the "image data" on a participant's terminal, the peripheral portions 1402, 1403 shown in FIG. 14 are dead spaces and an image is not displayed. In the present embodiment, a participant's terminal stores the target data in a memory unit and scales the display area of the target data and the image in the peripheral portion thereof stored in the memory unit based on information indicating the "display area" received from a presenter's terminal. Accordingly, in the conference system 100 according to the present embodiment, the image in the peripheral portion of the display area is displayed in the above-mentioned dead spaces.

<Conclusion>

As mentioned above, in the conference system 100 according to the present embodiment, information to specify the display area on the target data is synchronized between a plurality of terminal devices, the information being independent of screen sizes of the terminal devices. Further, each terminal device scales and displays, on the display unit, the display area of the target data and an image in the peripheral portion thereof such that an image of the display area of the target data is included in the display field of the display unit based on the received information to specify the display area. In accordance with this, in the conference system 100, it is possible to facilitate synchronization of display screens between a plurality of terminal devices having different directions of display screens, different aspect ratios, or the like.

The terminal device receives the information to specify the display area and scales the display area of the target data and the image in the peripheral portion thereof while maintaining an aspect ratio of the image in the display area. Further, in a preferred example, the terminal device scales the display area of the target data and the image in the peripheral portion thereof such that two opposite sides of the image in the display area of the target data are in contact with or in proximity to two opposite sides of the display field of the display unit. In accordance with this, it is possible to display the display area in a presenter's terminal at a maximum magnification. The display at the maximum magnification is an example and display may be rendered at other magnification such as 98%, 95%, or 90% of the maximum magnification, for example.

Further, each terminal device includes the memory unit that stores the target data and synchronizes information indicative of the display area of the target data. In accordance with this, the conference client device 102 is capable of reducing transmission and reception of a large amount of image data and displaying not only the display area of the target data but also the image in the peripheral portion of the display area.

The conference system 100 according to the present embodiment is an example of the conference system according to the present invention and various types of applications are possible depending on a purpose or a use. In the following, some examples of such application are schematically described.

<Other Embodiments>

Although the above-mentioned embodiment is described based on a case where the display area of the target data and the display field of the display unit are rectangles, other application is possible even if shapes of the display area and the display field are not rectangles.

Figure 15B:
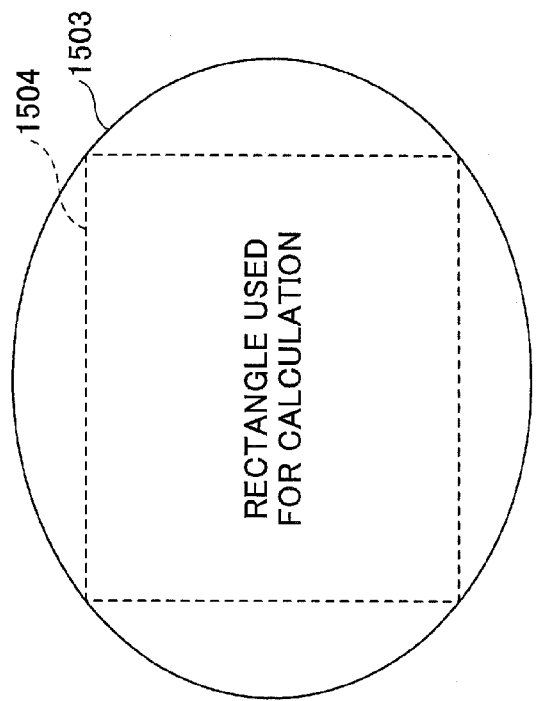
FIG. 15B is a diagram illustrating a process if a display area or a display field is not rectangular.
Figure 15A:
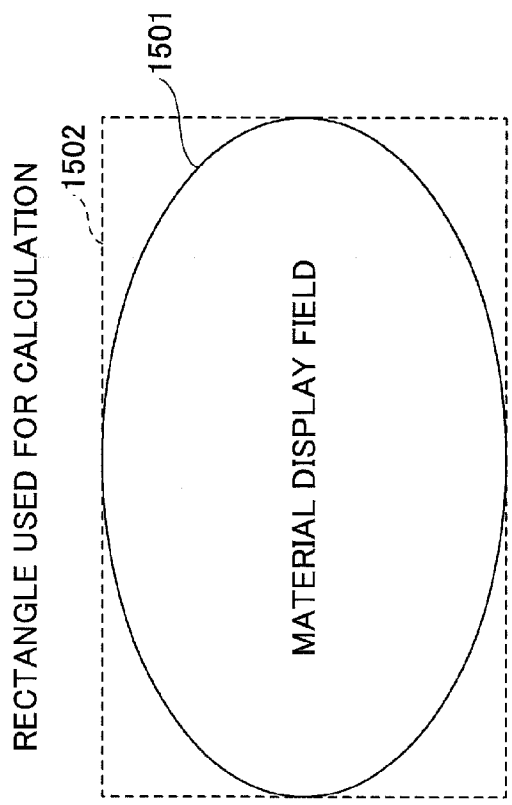
FIG. 15A is a diagram illustrating a process if a display area or a display field is not rectangular.

FIGS. 15A and 15B are diagrams illustrating processes if the display area or the display field is not rectangular. For example, as shown in FIG. 15A, if a material display field 1501 is an ellipse, it is possible to perform the same process as in the above-mentioned embodiment by regarding a rectangle 1502 circumscribed about the material display field 1501 as the display area of the target data. Further, as shown in FIG. 15B, if a display field 1503 of a terminal is an ellipse, it is possible to perform the same process as in the above-mentioned embodiment by using a rectangle 1504 inscribed in the display field 1503.

Further, the conference system 100 according to the above-mentioned embodiment is an example of the information processing system according to the present invention and does not limit the scope of the present invention. The information processing system according to the present invention can be suitably applied to various types of information sharing system in medical, educational, inter-vehicle, workplace, and home environments, for example.

Further, a device that transmits the display area of the target data does not necessarily need to be a terminal device but may be a server device that delivers various types of information such as map information, weather map information, and traffic information.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Further, the present invention is not limited to these embodiments, and various variations and modifications may be made without departing from the scope of the present invention.

The present application is based on and claims the benefit of priority of Japanese Priority Application No. 2013-246955 filed on Nov. 29, 2013, the entire contents of which are hereby incorporated by reference.

What is claimed is:

1. An information processing apparatus for displaying a specified display area of target data in a display unit, the target data being shared with another information processing apparatus, the information processing apparatus comprising:
   a memory unit configured to store the target data in advance; and
   a controller configured to:
      receive, via a network from the another information processing apparatus, information indicative of a portion of the target data to be retrieved from the memory for subsequent display and information indicative of the specified display area of the target data, specified according to a change in a display area made by an operation to a display unit in the another information processing apparatus;
      scale, via a display controlling unit, the target data, retrieved from the memory based upon the information indicative of a portion of the target data to be retrieved, to be within the specified display area, while maintaining an aspect ratio of the specified display area, the aspect ratio in the information processing apparatus being different from the aspect ratio of the another information processing apparatus, the controller being configured to scale at least partially based upon information about a display field of the display unit of the information processing apparatus; and
      display, via the display controlling unit, the scaled target data retrieved from the memory in the specified display area in the display unit such that the scaled specified display area is included in the display field of the display unit based on the received information indicative of the specified display area and based on received information about the display field of the display unit.

2. The information processing apparatus as claimed in claim 1, wherein the display controlling unit is configured to perform the scaling such that two opposite sides of the specified display area are in proximity to two opposite sides of the display field, and to display the display area at a maximum magnification.

3. The information processing apparatus as claimed in claim 1, wherein the display controlling unit is configured to scale additional information that are superimposed and displayed on the target data while maintaining a positional relationship between the additional information and the target data.

4. The information processing apparatus as claimed in claim 1, wherein the target data is downloaded from a server and, by transmitting and receiving operation information about the target data to and from the server, an operation of the target data by the information processing apparatus and an operation of the target data by the another information processing apparatus are synchronized.

5. The information processing apparatus as claimed in claim 1, wherein the target data is Portable Document Format (PDF) data and the specified display area employs information using CropBox.

6. The information processing apparatus as claimed in claim 1, wherein the display controlling unit is configured to perform the scaling such that two opposite sides of the specified display area are in contact to two opposite sides of the display field, and to display the display area at a maximum magnification.

7. The information processing apparatus as claimed in claim 1, wherein the information indicative of the specified display area is included in a page synchronization message of the target data received from the another information processing apparatus.

8. The information processing apparatus as claimed in claim 1, wherein the target data is conference material data, and the operation to the display unit is an operation of enlarging or reducing the display area of the conference material data by a presenter.

9. The information processing apparatus as claimed in claim 1, wherein the display controlling unit is configured to perform the scaling such that the target data to be within the specified display area, and an image in a peripheral portion of the specified display, are scaled while maintaining an aspect ratio of the specified display area and wherein the scaled target data retrieved from the memory in the specified display area and the image are displayed via the display unit such that the scaled specified display area is included in the display field of the display unit.

10. An information processing system comprising:
a conference server; and
a plurality of information processing apparatuses, at least one of the plurality of information processing apparatuses being configured to display a specified display area of target data in a display unit, the target data being shared with at least one other of the plurality of information processing apparatuses, the at least one of the plurality of information processing apparatuses comprising:
a memory unit configured to store the target data in advance; and
a controller configured to:
receive, via a network from the at least one other of the plurality of information processing apparatuses, information indicative of a portion of the target data to be retrieved from the memory for subsequent display and information indicative of the specified display area of the target data, specified according to a change in a display area made by an operation to a display unit in the at least one other of the plurality of information processing apparatuses;
scale, via a display controlling unit, the target data, retrieved from the memory based upon the information indicative of a portion of the target data to be retrieved, to be within the specified display area, while maintaining an aspect ratio of the specified display area, the aspect ratio in the at least one first of the plurality of information processing apparatuses being different from the aspect ratio of the at least one other of the plurality of information processing apparatuses, the controller being configured to scale at least partially based upon information about a display field of the display unit of the at least one of the plurality of information processing apparatuses; and
display, via the display controlling unit, the scaled target data retrieved from the memory in the specified display area in the display unit such that the scaled specified display area is included in the display field of the display unit based on the received information indicative of the specified display area and based on received information about the display field of the display unit.

11. The information processing system as claimed in claim 10, further comprising a second of the plurality of information processing apparatuses configured to transmit, as information indicative of the specified display area, information indicative of an area of the target data displayed in the second of the plurality of information processing apparatuses.

12. The information processing system as claimed in claim 10, further comprising a server device that transmits information indicative of the specified display area.

13. The information processing system as claimed in claim 10, wherein the display controlling unit is configured to perform the scaling such that two opposite sides of the specified display area are in proximity to two opposite sides of the display field, and to display the display area at a maximum magnification.

14. The information processing system as claimed in claim 10, wherein the display controlling unit is configured to perform the scaling such that two opposite sides of the specified display area are in contact to two opposite sides of the display field, and to display the display area at a maximum magnification.

15. The information processing system as claimed in claim 10, wherein the information indicative of the specified display area is included in a page synchronization message of the target data received from the at least one other of the plurality of information processing apparatuses.

16. The information processing system as claimed in claim 10, wherein the target data is conference material data, and the operation to the display unit is an operation of enlarging or reducing the display area of the conference material data by a presenter.

17. The information processing system as claimed in claim 10, wherein the display controlling unit is configured to perform the scaling such that the target data to be within the specified display area, and an image in a peripheral portion of the specified display, are scaled while maintaining an aspect ratio of the specified display area and wherein the scaled target data retrieved from the memory in the specified display area and the image are displayed via the display unit such that the scaled specified display area is included in the display field of the display unit.

18. An information processing method for displaying a specified display area of target data in a display unit of an information processing apparatus, the target data being shared with another information processing apparatus, the information processing method comprising:

storing the target data in advance in a memory;

receiving information indicative of a portion of the target data to be retrieved from the memory for subsequent display and information indicative of the specified display area of the target data, specified according to a change in a display area made by an operation to a display unit in the another information processing apparatus;

scaling the target data, retrieved from the memory based upon the information indicative of a portion of the target data to be retrieved, to be within the specified display area, while an aspect ratio of the specified display area is maintained, the aspect ratio in the information processing apparatus being different from the aspect ratio of the another information processing apparatus, and the scaling at least partially being based upon information about a display field of the display unit of the information processing apparatus; and displaying the scaled target data retrieved from the memory in the specified display area in the display unit such that the scaled specified display area is included in the display field of the display unit based on the received information indicative of the specified display area and based on received information about the display field of the display unit.

19. The information processing method as claimed in claim 18, wherein the scaling is performed such that two opposite sides of the specified display area are in proximity to two opposite sides of the display field.

20. The information processing method as claimed in claim 18, further comprising scaling additional information superimposed and displayed on the target data while maintaining a positional relationship between the additional information and the target data.

21. The information processing method as claimed in claim 18, further comprising:

downloading the target data from a server; and transmitting and receiving operation information about the target data to and from the server, thereby synchronizing an operation of the target data by the information processing apparatus with an operation of the target data by the another information processing apparatus.

22. The information processing method as claimed in claim 18, wherein the target data is Portable Document Format (PDF) data and the specified display area employs information using CropBox.

23. The information processing method as claimed in claim 18, wherein the scaling is performed such that two opposite sides of the specified display area are in proximity to two opposite sides of the display field, and wherein the displaying includes displaying the display area at a maximum magnification.

24. The information processing method as claimed in claim 18, wherein the scaling is performed such that two opposite sides of the specified display area are in contact to two opposite sides of the display field, and wherein the displaying includes displaying the display area at a maximum magnification.

25. The information processing method as claimed in claim 18, wherein the information indicative of the specified display area is included in a page synchronization message of the target data received from the another information processing apparatus.

26. The information processing method as claimed in claim 18, wherein the target data is conference material data, and the operation to the display unit is an operation of enlarging or reducing the display area of the conference material data by a presenter.

27. The information processing method as claimed in claim 18, wherein the scaling is performed such that the target data to be within the specified display area, and an image in a peripheral portion of the specified display, are scaled while maintaining an aspect ratio of the specified display area and wherein the displaying includes displaying the scaled target data retrieved from the memory in the specified display area and the image, via the display unit, such that the scaled specified display area is included in the display field of the display unit.

* * * * *